Aug. 8, 1961   J. M. CLUWEN   2,995,692
ROTARY SYSTEM DRIVEN BY ELECTRICAL ENERGY
Original Filed Oct. 20, 1955

INVENTOR.
J. M. CLUWEN
BY
Fred M. Vogel
AGENT

United States Patent Office 2,995,692
Patented Aug. 8, 1961

2,995,692
ROTARY SYSTEM DRIVEN BY ELECTRICAL ENERGY
Johannes Meyer Cluwen, Eindhoven, Netherlands, assignor, by mesne assignments, to North American Philips Company, Inc., New York, N.Y., a corporation of Delaware
Original application Oct. 20, 1955, Ser. No. 541,785, now Patent No. 2,890,400, dated June 9, 1959. Divided and this application May 20, 1958, Ser. No. 740,509
Claims priority, application Netherlands Nov. 24, 1954
6 Claims. (Cl. 318—254)

The present application is a division of U.S. patent application Serial No. 541,785, filed October 20, 1955, now Patent No. 2,890,400.

This invention relates to rotary systems driven by electrical energy. It has for its object to provide a simple device which permits, for example, a very high speed of the rotary system. In accordance with the present invention, the rotary system comprises at least one permanent magnet, poles of which cooperate with a pick-up coil and a driving coil, thus producing electrical oscillations in the pick-up coil which are supplied to the driving coil through an electric amplifier fed by the electrical energy.

Conventional devices comprising rotary system driven by electrical energy and having permanent magnets are based on the so-called electric motor principle whereby alternating current energy is supplied to the stator windings of an electric motor, thus causing rotation of the permanent magnetic armature of the motor at a speed determined by the frequency of the alternating current. In order to be able to increase the speed, it would be necessary for the alternating-current frequency to be adjusted to steadily increasing values. Due to the present invention, the required alternating current is supplied by the electric amplifier, so that its frequency is always matched to the speed of the rotary system.

In order that the invention may be readily carried into effect, it will now be described, by way of example, with reference to the accompanying drawings, wherein.

Figure 1:
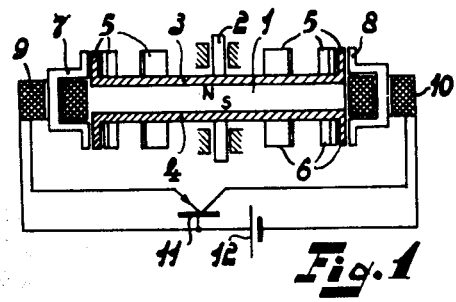
FIG. 1 is a schematic diagram of an embodiment of a device according to the invention.
Figure 2:
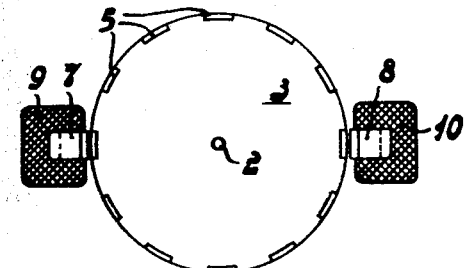
FIG. 2 is a plan view of a portion of the embodiment of FIG. 1.

In the embodiments of FIGS. 1 and 2, the rotary system comprises a circular magnetic disc 1 which is axially magnetized and which is arranged on a shaft 2 and flanked by weak-magnetic discs 3 and 4. The discs 3 and 4 are provided with teeth 5 and 6 by bending of the weak-magnetic material. The teeth 5 and 6 co-operate with weak magnetic cores 7 and 8, respectively, of an immovably arranged pick-up coil 9 and a similarly arranged driving coil 10, respectively. The coils 9 and 10 are interconnected via an amplifier 11 and a source of supply 12.

The poles N and S of the disc 1 when rotating via the teeth 5 and 6 produce an alternating magnetic flux in the core 7, thus inducing in the coil 9 and alternating voltage which, after being amplified in the amplifier 11, produces a corresponding current in the coil 10. Said current produces a magnetic field which, with appropriate winding direction of the coil 10, causes at the correct moment attraction of the teeth 5 via the core 8, thus maintaining the rotational movement of the disc 1.

The energy for the device is fully supplied by the source 12; the disc 1, once being started acquiring a steadily increasing speed until the energy of the current pulses supplied to the coil 10 and the amplitude of which is limited in conformity with the value of the source 12 is in equilibrium with the energy released by the rotary system 1, 2, 3, 4. With constant load on the rotary system 1, 2, 3, 4, the speed is thus substantially determined only by the value of the source of supply 12 and may increase to very high values due to the light construction of the system.

It is not only possible to utilize the rotational energy thus produced, but the production of the electric current pulses may be the particular purpose of the device. The rotary system may be connected, for example, either to an ultracentrifuge or a "Nipkow" disc, or form part of a gyroscopic compass. Furthermore, when use is made of a sufficiently large number of teeth, it may be operated at lower speeds, for example for driving the turntable of an electric record player. On the other hand, the electric alternating current produced, if desired after frequency multiplication, may serve to supply an electric circuit, it being possible, if desired, to utilize, for example, automatic frequency control by controlling the value of the source 12.

In the embodiment of FIGS. 1 and 2, the two coils 9 and 10, may, if desired, be arranged close to one another or even on a common core. Furthermore, it is possible, if necessary, to arrange a plurality of coupled pick-up and/or driving coils along the circumference of the toothed rims of the discs 3 and 4.

Figure 3:
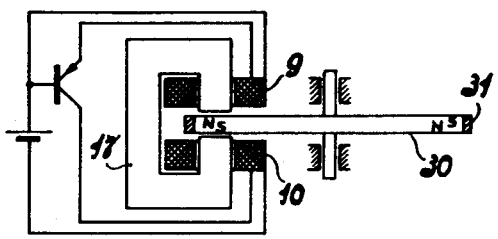
FIG. 3 is a modification of FIG. 1.
Figure 4:
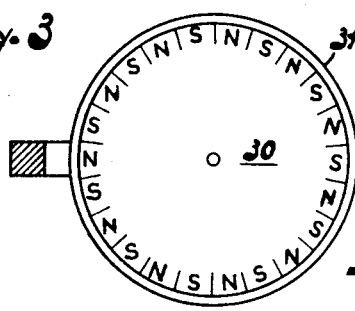
FIG. 4 is a plan view of a portion of the embodiment of FIG. 3.

FIGURES 3 and 4 show a modification of FIG. 1 in which use is made of a magnet 30 having an axial magnetisation whose polarity alternately changes along its circumference. A non-magnetic ring 31 serves to protect the magnet 30 against adverse effects of the centrifugal force, and may also be advantageous in the embodiment of FIG. 1. Since the coils 9 and 10 are arranged on a common core 17, another advantage of the embodiment of FIG. 6 over that of FIG. 1 is that the field of the coil 10 intensifies the variations in the flux through the coil 9, leading to current pulses having steeper flanks. If desired, the magnetisation of the magnet 30 could, for example, be chosen to be radial, in which event the construction of the coil 32 must, of course, be modified accordingly.

Figure 5:
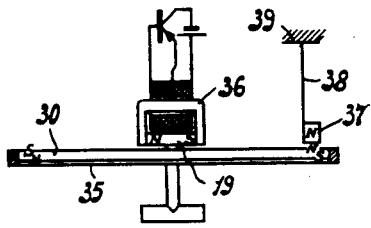
FIG. 5 is a modification of FIG. 1.

In the modification shown in FIGURE 5, the magnetic disc 30, which is axially magnetized as in FIG. 3, is provided on a weak-magnetic carrier plate 35 short-circuiting magnetically the poles of one flat surface of the disc 30. The comparatively narrow poles on the other flat surface cooperate with a coil system 36 which also comprises an auxiliary magnet 19. Similar modifications may, of course, also be made in the embodiment of FIGURE 6.

Both mechanical and electrical means may serve to stabilize the speed and the frequency of the electrical oscillations produced. FIGURE 5 embodies a mechanical stabilization constituted by an auxiliary magnet 37 cooperating with the poles of the disc 30 and secured by means of a spring 38 to a fixed point 39, said auxiliary magnet thus extracting mechanical energy from the disc 30 when the disc 30 reaches a speed corresponding to the natural frequency of the resonance system 37, 38, so that further increase of this speed is counteracted. Of course the resonance system 37, 38 may alternatively cooperate with other poles of the disc 30 which are provided nearer to the shaft.

Figure 6:
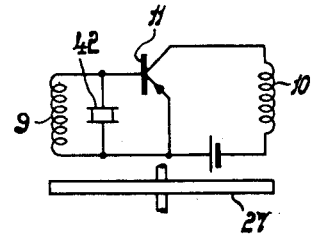
FIG. 6 is a schematic diagram of an arrangement for stabilizing the speed and frequency of the embodiments of FIGS. 1 and 3.

FIGURE 6 embodies an electrical stabilization comprising a highly selective element 42 included in one of the circuits of the amplifier 11. The element 42, for example a piezo-electric vibrator, which is made of, for example, barium-titanate greatly decreases the gain of the circuit 9, 42, 11, 10 at the moment when the frequency of the electrical oscillations produced approaches the resonance frequency of the element 42, so that this frequency and hence the speed of the rotary system 27 does not increase further.

What is claimed is:

1. Apparatus for maintaining mechanical rotation, comprising a pickup coil, a single permanent magnet of substantially disc-like configuration rotatively mounted in operative relation to said coil, said magnet being magnetized in a direction parallel to the axis of relative rotative motion, a plurality of spaced teeth positioned in planes substantially perpendicular to the plane of said disc extending above and below said disc and affixed along the periphery of said disc, said magnet having a plurality of poles so arranged with respect to said coil that an electric pulse is produced by said coil each time one of said teeth passes in close proximity to said coil, and means responsive to said pulses for exerting driving force pulses upon said magnet thereby to sustain said magnet in rotative motion relative to said coil, said pulse responsive means comprising a driving coil mounted in operative relation to said magnet and pulse amplifier means interposed between said pickup coil and said driving coil, said driving coil being constructed and arranged in relation to said pickup coil so as to exert a repelling force on said magnet upon the application of an energizing pulse from said pickup coil through said amplifier means.

2. Apparatus as claimed in claim 1, wherein said amplifier means is blocked for input signals of one electrical phase and is unblocked for input signals of an electrical phase which is opposed to said one phase.

3. Apparatus for maintaining mechanical rotation, comprising a pickup coil, a single permanent magnet of substantially disc-like configuration rotatively mounted in operative relation to said coil, said magnet being magnetized in a direction parallel to the axis of relative rotative motion, said magnet having a plurality of alternately changing poles along it periphery so arranged with respect to said coil that an electric pulse is produced by said coil each time a portion of said magnet wherein a change of polarity occurs passes in close proximity to said coil, and means responsive to said pulses for exerting driving force pulses upon said magnet thereby to sustain said magnet in rotative motion relative to said coil, said pulse responsive means comprising a driving coil mounted in operative relation to said magnet and pulse amplifier means interposed between said pickup coil and said driving coil, said driving coil being constructed and arranged in relation to said pickup coil so as to exert a repelling force on said magnet upon the application of an energizing pulse from said pickup coil through said amplifier means.

4. Apparatus for maintaining mechanical rotation, comprising a magnetic core, a pickup coil mounted on said core, a single permanent magnet of substantially disc-like configuration mounted in operative relation to said coil, said magnet being magnetized in a direction parallel to the axis of relative rotative motion, said magnet having a plurality of poles so arranged with respect to said coil that an electric pulse is produced by said coil each time a portion of said magnet wherein a change of polarity occurs passes in close proximity to said coil, means responsive to said pulses for exerting driving force pulses upon said magnet thereby to sustain said magnet in rotative motion relative to said coil, said pulse responsive means comprising a driving coil mounted on said core in operative relation to said magnet and pulse amplifier means interposed between said pickup coil and said driving coil, a first auxiliary magnet positioned in cooperative relation to said permanent magnet, a spring securely anchored at one end, and a second auxiliary magnet positioned on the other end of said spring in cooperative relation with said permanent magnet.

5. Apparatus for maintaining mechanical rotation, comprising a pickup coil, a single permanent magnet of substantially disc-like configuration rotatively mounted in operative relation to said coil, said magnet being magnetized in a direction parallel to the axis of relative rotative motion, said magnet having a plurality of poles so arranged with respect to said coil that an electric pulse is produced by said coil each time a portion of said magnet wherein a change of polarity occurs passes in close proximity to said coil, means responsive to said pulses for exerting driving force pulses upon said magnet thereby to sustain said magnet in rotative motion relative to said coil, said pulse responsive means comprising a driving coil mounted in operative relation to said magnet and pulse amplifier means interposed between said pickup coil and said driving coil, said amplifier means comprising a transistor having emitter, collector and base electrodes and means for forming a base-emitter input circuit, and a piezoelectric element connected in said input circuit, said pickup coil being connected in shunt across said piezoelectric element.

6. Apparatus for maintaining mechanical rotation, comprising a pick-up coil, a single permanent magnet of substantially disc-like configuration mounted in operative relation to said coil, said magnet being magnetized in a direction parallel to the axis of relative rotative motion and having a plurality of poles so arranged with respect to said coil that an electric pulse is produced by said coil each time one of said poles passes in close proximity to said coil, and means responsive to said pulses for exerting driving force pulses upon said magnet thereby to sustain said magnet in rotative motion relative to said coil, said means comprising a driving coil mounted in operative relation to said magnet and a pulse amplifier interposed between said pick-up coil and said driving coil, said driving coil being constructed and arranged in relation to said pick-up coil so as to exert a repelling force on said magnet upon the application of an energizing pulse from said pick-up coil through said amplifier.

No references cited.